United States Patent [19]

Oyler

[11] Patent Number: 5,061,375
[45] Date of Patent: Oct. 29, 1991

[54] GRIT REMOVAL DEVICES AND METHOD OF USING SAME

[75] Inventor: Kenneth W. Oyler, Richmond, Va.

[73] Assignee: Infilco Degremont Inc., Richmond, Va.

[21] Appl. No.: 609,405

[22] Filed: Nov. 5, 1990

[51] Int. Cl.$^5$ .............................................. B01D 21/30
[52] U.S. Cl. .................................... 210/744; 210/739;
210/787; 210/97; 210/104; 210/143; 210/512.1;
210/512.3; 210/532.1; 210/533; 210/534;
209/144; 209/169; 209/211
[58] Field of Search .................. 210/739, 744, 787, 86,
210/97, 121, 122, 123, 124, 125, 126, 127, 128,
129, 143, 512.1, 512.3, 523, 532.1, 533, 534, 104;
209/144, 169, 211

[56] References Cited

U.S. PATENT DOCUMENTS

| 3,589,519 | 6/1971 | Bendel ............................ 210/208 |
| 3,941,698 | 3/1976 | Weis ................................ 210/257.1 |
| 4,160,734 | 7/1979 | Taylor et al. .................... 210/202 |
| 4,767,532 | 8/1988 | Weis ................................ 210/512.3 |

Primary Examiner—Robert A. Dawson
Assistant Examiner—David Reifsnyder
Attorney, Agent, or Firm—Carroll F. Palmer

[57] ABSTRACT

The efficiency of operation of vortex grit removal devices, typically used in wastewater treatment plants, is improved by measuring changes in the vertical level of liquid contained in the device as the grit removal operation progresses and using such level change measurements to automatically control the speed of rotation of the grit remover's rotor used to impart vortical motion to such body of liquid. Devices for performing such improved vortex grit removal operations are disclosed.

3 Claims, 2 Drawing Sheets

GRIT REMOVAL DEVICES AND METHOD OF USING SAME

BACKGROUND OF THE INVENTION

1. Field of the Invention

This application relates broadly to devices and methods for the removal of grit, i.e., small particles like fine sand, from liquid suspensions thereof. More particularly, it concerns (a) improved methods for grit removal from water in wastewater treatment operations while mitigating inclusion of putrecibles in the removed grit and (b) improved equipment for carrying out such methods.

2. Description of the Prior Art

Sewage entering a wastewater treatment plant carries with it grit particles such as sand and other inert particles having a particle size that may vary from under 0.15 mm to over 1.00 mm, typically in a range from about 50 mesh (0.297 mm) to about 120 mesh (0.125 mm). To prevent wear on mechanical equipment within the treatment plant, the grit must be removed by grit removal devices.

There are four basic types of grit removal devices, namely, horizontal constant velocity channels, aerated grit chambers, short-term sedimentation tanks and vortex chamber grit removers (see U.S. Pat. Nos. 3,941,698 and 4,767,532). This present invention relates to the latter type of grit remover devices.

The vortex chamber devices utilize two separate forces, i.e., gravitional and centrifugal, to separate grit from the wastewater while selectively maintaining organic particles, so-called putrecibles, in suspension. Typically a submerged turbine rotor generates hydraulic profiles to provide the centrifugal forces to sweep the grit while hopefully allowing the putrecibles to remain in suspension.

The performance requirements for grit removers as stated in the WPCF 1977 edition of the *Manual Of Practice On Wastewater Treatment Plant Design* requires that grit of 0.2 mm (65 mesh) and larger should be removed and the discharged grit shall contain no more than 3% by weight putrecibles. Typical consulting engineer specifications require that grit removers remove 90% of grit larger than 50 mesh (0.297 mm), 80% of grit larger than 100 mesh (0.149 mm) and 60% of grit larger than 120 mesh (0.125 mm).

Grit particles vary in density so particles of the same size may exhibit differing settling velocities. Hence, in the construction and operation of vortex grit removers, primary attention has centered on overflow rate or rise rate of the wastewater passing in the vortex chamber. Thus, since settling velocities occur over a range, if the wastewater rise rate exceeds the minimum grit settling rate, loss of that size particle will result. For example, settling velocity studies have determined that 0.15–0.2 mm particles have settling rates of from about 1.68 to 8.4 ft/min and when these size particles were subject to a rise rate of 2.0 ft/min, 3.3% of particles would be lost, while 92.7% would be lost at 4.0 ft/min rise rate.

The advance in the art of construction and operation of vortex grit removers provided by the present invention results from the discovery that another factor in addition to rise rate plays an important part in the efficiency with which grit can be removed in such devices, namely, that there is a functional relationship between rise rate and the speed of rotation of the rotor imparting vortical motion to the liquid present in such chamber and that this may be used to automatically control speed of rotor rotation.

OBJECTS

A principal object of the invention is the provision of improved devices and methods for the removal of grit, i.e., small particles like fine sand, from liquid suspensions thereof.

Further objects include the provision of:

1. Improved methods for grit removal from water in wastewater treatment operations while mitigating inclusion of putrecibles in the removed grit.

2. Improved equipment for carrying out such methods.

3. Vortex grit removal devices that automatically change rotor speed as flow rate in the vortex chamber varies.

4. Unique control arrangements in vortex grit removers for automatically changing rotor speed as flow rate in the vortex chamber changes.

5. Automation of maintenance of optimum velocity and hydraulic profiles within the vortex chamber to maximize grit removal and mitigate putrecibles content in removed grit.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

The objects are accomplished in accordance with the invention by the provision of improvements in known vortex grit removal systems that typically include a liquid holding chamber, a grit receiving sump, pump means to remove grit from the sump, a rotor unit positioned centrally in the chamber to rotate about a vertical axis to impart vortical motion to liquid present in the chamber, motor means to rotate the rotor, influent means to charge liquid containing suspended grit into the chamber and effluent means to discharge clarified liquid from the chamber.

The improvement in accordance with the invention for improving efficiency of removing grit from the influent while decreasing the putrecibles content in the removed grit, in part, is the provision of new vortex grit removal devices that basically comprise (a) control means to vary the speed of rotation of the motor means and the rotor unit and (b) liquid level detection means for determining changes in level of the liquid present in the chamber and regulate the control means to adjust vortical motion in the liquid present in the chamber as a predetermined function of change in level of the liquid present in the chamber. In preferred embodiments, the grit removal system is a portion of a wastewater treatment plant.

Improvements in the art in accordance with the invention also involve new methods for operation of vortex grit removal devices which comprise (A) measuring changes in the vertical level of the contained influent in a vortex grit removal device as the grit removal method progresses, and (B) automatically controlling the speed of rotation of the rotor means in relation to measured changes in such vertical level.

BRIEF DESCRIPTION OF THE DRAWINGS

A more complete understanding of the invention can be obtained by reference to the accompanying drawings in which.

DESCRIPTION OF THE PREFERRED EMBODIMENTS

Figure 1:
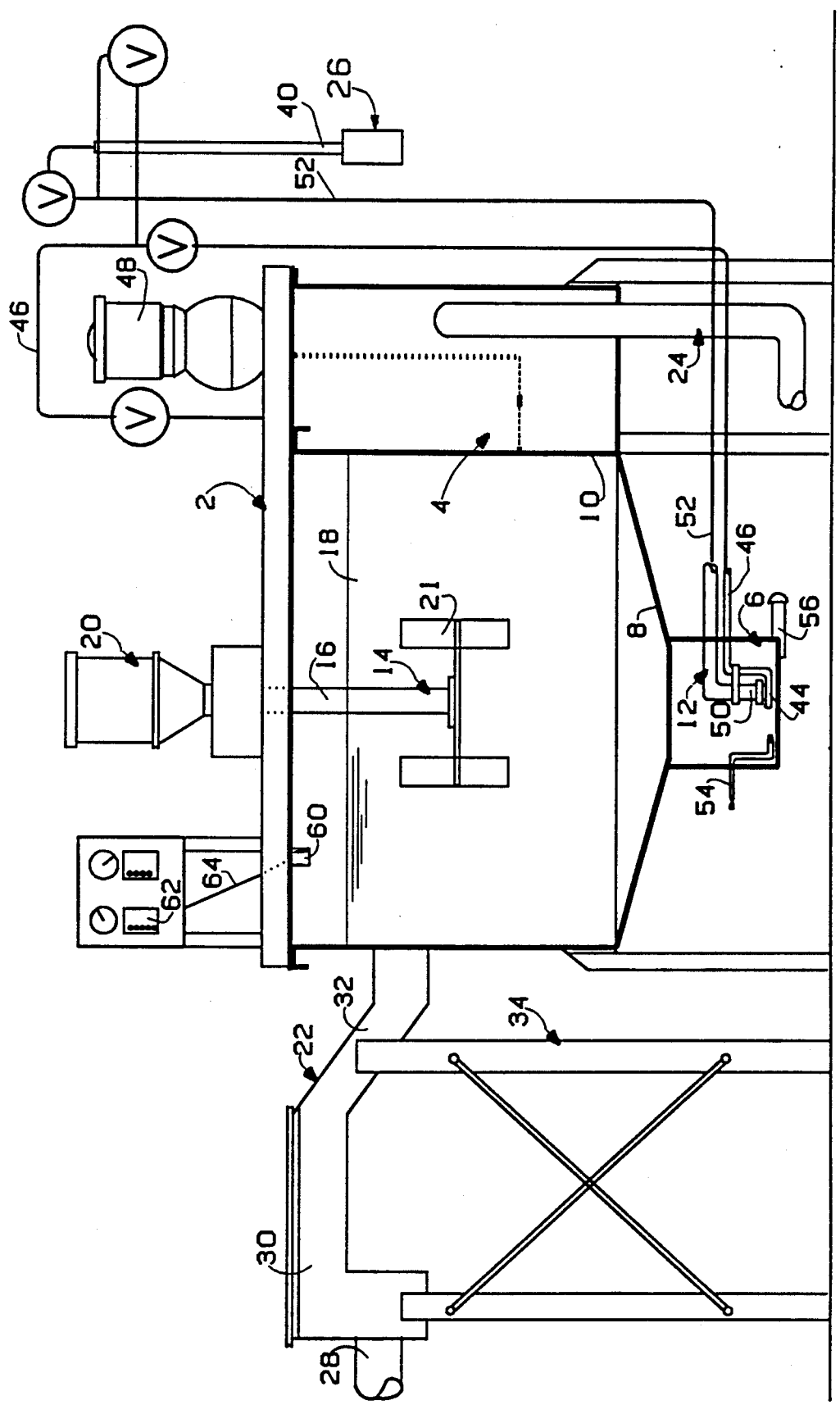
FIG. 1 is lateral view partially in section of one embodiment of a vortex grit removal device in accordance with the invention.

Referring in detail to the drawings, the vortex grit removal device 2 of the invention involves elements that are conventional in the art including a liquid holding chamber 4, a grit receiving sump 6, a floor 8 in the chamber that slopes downward from the periphery 10 of the chamber 4 to the sump 6 to assist grit falling on the floor (not shown) to move into the sump 6, pump means 12 to remove grit (not shown) from the sump, a rotor unit 14 to rotate on a vertical shaft 16 to impart vortical motion to liquid 18 present in the chamber, motor means 20 to rotate the rotor 21, influent means 22 to charge liquid influent into the chamber 4 and effluent means 24 to discharge clarified liquid (not shown) from chamber 4.

In addition to these basic conventional components of vortex grit removal devices, the removal device 2 may comprise additional conventional components including a grit dewatering means 26, e.g. a cyclone classifier, a screw classifier or a combination of these (not shown).

In the embodiment of FIG. 1, the influent means 22 comprises inlet conduit 28, inlet flume 30, submerged inlet 32 and a standard unit 34. Also, the screen unit 26 comprises a, grit discharge inlet line 40.

The pump means 12 comprises water jet member 44 connected by line 46 to the pressurization pump 48 and grit discharge member 50 connected by line 52 to the grit discharge inlet line 40 of screen unit 26.

The sump 6 includes a sample port 54 and drain 56.

An essential component of the improved devices of the invention is liquid level detection means 60 for determining changes in level of the liquid 18 present in the chamber 4. In the embodiment show in FIG. 1, the detection means 60 is an ultrasonic level detection device, but a variety of other available devices may be used in accordance with the invention including electronic probes, float switches, limit switches with attached bulb type floats, radio frequency type probes, capacitance type probes, rod type probes and other types of mechanical or electro-mechanical type level detection devices.

Another essential component is control means 62 to vary the speed of rotation of the motor means 20 and the rotor unit 14 operatively connected via conductor line 64 to level detection means 60 to automatically adjust vortical motion in the liquid 18. There are commercially available numerous devices that can be used as the control means 62 in accordance with the invention. For example, means 62 can be a thyristor type unit to control the electrical input to the motor means 20. Alternatively, means 62 can be a gear or belt transmission (not shown) connecting the shaft 16 to the motor means 20. An example of a commercially available control means 62 is Eurodrive ™ Varimat remote speed controller.

Figure 2:
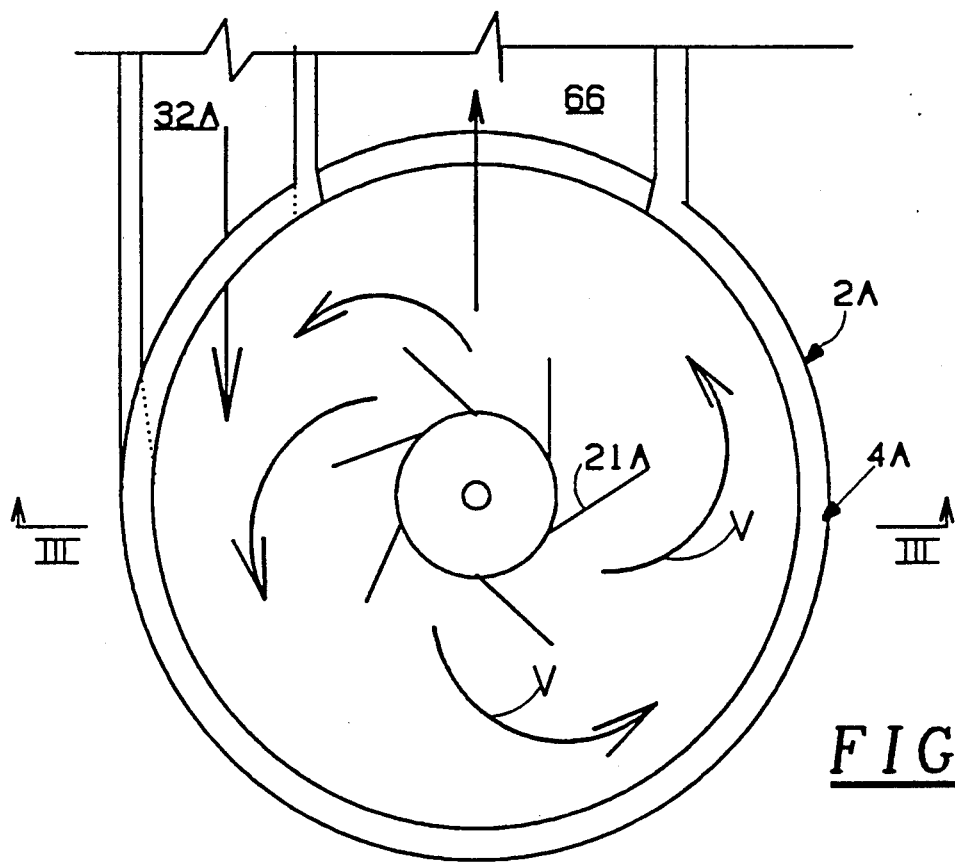
FIG. 2 is a diagrammatic plan view of another embodiment of a vortex grit removal device of the invention.
Figure 3:
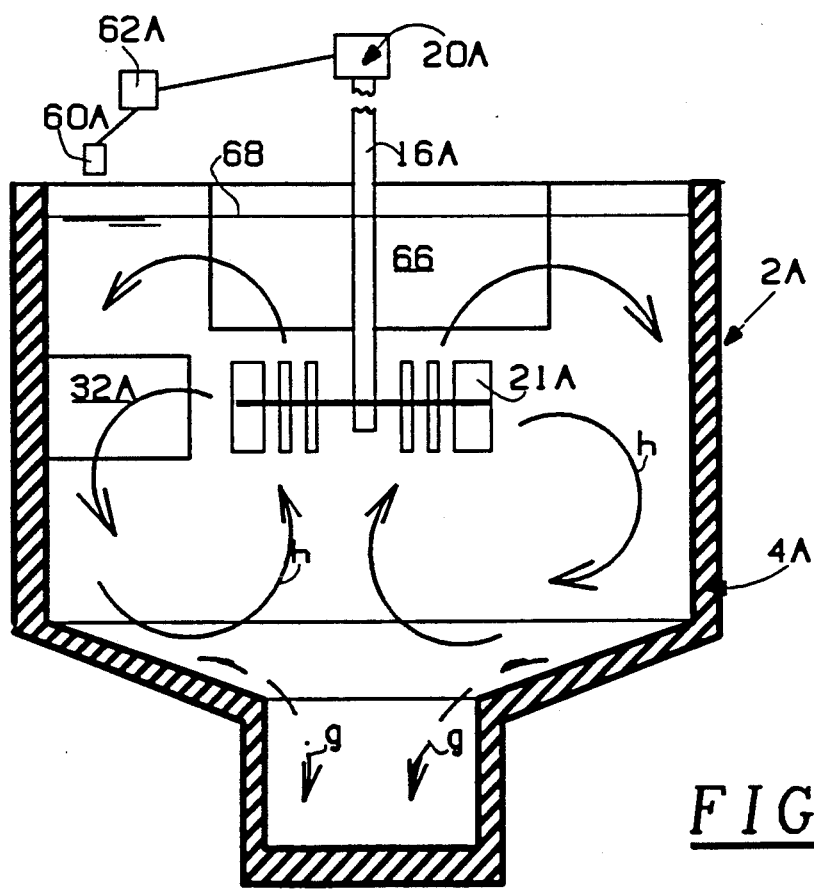
FIG. 3 is a sectional view taken on the line III—III of FIG. 2.

FIGS. 2 and 3 assist in describing the operation of the new grit removal devices of the invention. The basic device 2A comprises chamber 4A, grit sump 6A, rotor 21A, submerged inlet 32A and effluent outlet 66. The water level 68 in the chamber 4a changes as the flow rate of influent through inlet 32A increases or decreases. The liquid level detector 60A senses the water level in the chamber 4A and sends a signal to control means 62A which determines what the speed of rotation of rotor 21A should be for the instant influent flow rate to provide the velocity (indicated by arrows "v") and hydraulic profiles (indicated by arrows "h") to obtain maximum removal of grit (indicated by the broken arrows "g") with minimum putrecibles content for such flow rate. With this determination, the control means 62A automatically adjusts the speed of rotation of the rotor 21A.

Typically, at peak influent flow rate, the rotor speed will be about 20% of full speed, at average flow rate the rotor speed will be about 60% of full speed and at low flow rate the rotor speed will be 100% of full speed.

The embodiments of the invention in which an exclusive property or privilege is claimed are defined as follows:

1. In a vortex grit removal system including a liquid holding chamber, a grit receiving sump, pump means to remove grit from said sump, a rotor unit positioned centrally in said chamber to rotate on a vertical axis to impart vortical motion to liquid present in said chamber, motor means to rotate said rotor, influent means to charge liquid containing suspended grit into said chamber and effluent means to discharge clarified liquid from said chamber, the improvement for improving efficiency of removing grit from said influent while mitigating putrecibles content in the removed grit which comprises:

liquid level detection means for determining changes in level of said liquid present in said chamber and control means to receive input from said detection means and automatically regulate the speed of rotation of said motor means to adjust vortical motion in said liquid present in said chamber as a predetermined function of change in level of said liquid present in said chamber.

2. The grit removal system of claim 1 having a floor in said chamber that slopes downward from the periphery of said chamber to said sump to assist grit falling on said floor to move into said sump.

3. In a method for grit removal from a liquid influent wherein vortical motion is imparted to a cylindrical body of said influent contained in a liquid holding chamber by rotor means positioned in said chamber and portions of said grit fall from said body of influent as a result, in part, of said vortical motion to move into a sump from which said grit is periodically removed by pump means, the improvement for improving efficiency of removing grit from said influent while mitigating inclusion of putrecibles in said removed grit which comprises:

measuring changes in the vertical level of said contained influent as said grit removal method progresses and automatically controlling the speed of rotation of said rotor means in relation to measured changes in said vertical level.

* * * * *